United States Patent [19]

Geeck

[11] 4,040,314
[45] Aug. 9, 1977

[54] CHAIN SAW BLADE SHARPENING ACCESSORY

[76] Inventor: Joseph S. Geeck, 6355 Jefferson Highway, Harahan, La. 70123

[21] Appl. No.: 613,445

[22] Filed: Sept. 15, 1975

[51] Int. Cl.² .......................... B23D 63/16; B24B 3/36
[52] U.S. Cl. ................................. 76/78 R; 51/216 H; 76/112
[58] Field of Search ............... 76/25 A, 42, 74, 78 R, 76/112; 51/225, 288, 281 R, 216 R, 216 A, 216 H

[56] References Cited

U.S. PATENT DOCUMENTS

| 896,357 | 8/1908 | Brown | 76/25 A |
|---|---|---|---|
| 2,217,145 | 10/1940 | Stihl | 51/216 R X |
| 2,458,058 | 1/1949 | Carrol | 76/74 |
| 2,589,165 | 3/1952 | Toy | 76/78 X |
| 3,006,222 | 10/1961 | McEwan | 76/78 X |
| 3,013,448 | 12/1961 | Deck | 76/78 R |
| 3,071,026 | 1/1963 | Dewitt | 76/78 R X |
| 3,592,085 | 7/1971 | Arneson | 76/42 X |
| 3,903,760 | 9/1975 | Jones | 76/42 X |

OTHER PUBLICATIONS

Treyco Saw Sharpening Fixture, Advertising Bulletin, 1958.

*Primary Examiner*—Al Lawrence Smith
*Assistant Examiner*—Nicholas P. Godici

[57] ABSTRACT

A grinder accessory for use with a bench grinder including a uniquely designed three element structure and associated connecting and releasing means for attaching the accessory to the grinder when chain saw blades are to be sharpened while permitting quick removal of the grinder accessory to permit other uses of the grinder. The system includes a grinder mounting bracket, a bushing mount with a lower bracket mounting extension, and a dog latched chain saw positioning and holding tool. The mounting bracket bolts directly to the frame of the bench grinder using a screw and locknut inserted into a pre-existing hole in the grinder frame with the bushing mount located along a channel in the bracket at a position suitable to permit engagement of the grinder wheel with the cutting edges of the blades of the chain saw. The chain saw positioning and holding tool is adapted through mounting arms to telescopically engage the bushing by retractable dogs while permitting rotation after engagement with the bushing to accurately present the chain saw blade to the grinder wheel as desired. Two oppositely directed mounted arms are used to insert opposite sides of the chain saw positioning and holding tool within the bushing to permit sharpening of both sets of edges of the chain saw blade.

13 Claims, 8 Drawing Figures

CHAIN SAW BLADE SHARPENING ACCESSORY

BACKGROUND OF THE INVENTION

1. Field of the Invention

The present invention relates to an accessory to a grinder allowing the use of an ordinary machine bench grinder to sharpen chain saw blades. The present invention has been found to be particularly useful in the chain saw sharpening art and, hence, will be discussed with the particular reference thereto. However, the present invention may be applicable to other types of accessories for sharpening chain mounted cutting edges requiring portably mounted apparatus attached in fixed relation to a sharpening wheel as well.

2. Description of the Prior Art

Machine bench grinders have been known and used in the prior art for sharpening a great variety of tools. However, because of the particular difficulty encountered in sharpening cutting edges mounted on chains, as well as dual sets of cutting edges required for chain saws, specialized sharpeners especially adapted with an integral grinder or separate hand tools have been the only mechanisms for chain saw blade sharpening in the art.

Several types of manual mountings and guides designed to work with a hand-type file including some for chain saw blades, have been known and used before, and typical examples thereof are shown in the following U.S. Pat. Nos.: 2,737,830, 3,172,306, 3,338,116.

All of these devices, however, may only be used with hand held tools and therefore are not capable of mounting in the correct relationship with the grinder wheel to facilitate quick and efficient sharpening through mechanized means.

Several types of mechanized sharpening devices, including some for chain saw blades, have been known and used before, and typical examples thereof are shown in U.S. Patents listed below: U.S. Pat. Nos. 2,615,336; 2,704,948; 2,792,724; 2,805,587; 2,811,873; 2,813,438; 2,821,097; 2,932,994; 2,986,084; 3,006,222; 3,020,783; 3,038,355; 3,071,026; 3,089,351.

However, none of these devices teach the combination of an ordinary machine grinder with a separate, easily removable accessory that permits an ordinary machine grinder to sharpen chain saw blades as well as perform its regular grinder functions.

GENERAL DISCUSSION OF THE INVENTION

The present invention is a very simple but highly effective design to sharpen chain saw blades including a mounting bracket, a bushing mount, and a tool, the bracket and bushing combining to form a rigid mounting properly located on the housing of the grinder for the sharpening tool. Latching means are provided for prevention of the release of the sharpening tool once engaged telescopically with the bushing until it is manually released by the operator of the sharpening tool while permitting rotation of the tool. Holding means are also included to rigidly hold the chain to the sharpening tool while the edges are being sharpened, rotating the tool to engagement with the grinder wheel.

The present invention, while utilizing a grinding wheel in fixed relation to a sharpening tool, uses an ordinary machine grinder and adapter to accurately present the blades of the chain saw to the grinder wheel. The tool is also adapted to present one set of cutting surfaces to the grinder wheel and then to permit reversal of the tool with respect to the bushing to permit sharpening of cutting edges of the other set of blades of the chain saw. The entire mechanism is portably mounted to the grinder so that it may be removed from the grinder housing to the extent necessary to permit the operator of the grinder wheel to use the grinder wheel for other purposes. Additionally, handles may be mounted on the holding means to facilitate releasing of the holding means where grinder spacing permits.

DETAILED DESCRIPTION OF THE PREFERRED EMBODIMENT

Introduction

The preferred embodiment of the grinder accessory of the present invention may be used to adapt ordinary machine grinders to sharpen chain saw blades cutting surfaces wherein it is important the the blades be sharpened without the use of a special sharpening and grinding mechanism. A particularly important area of application of the present invention is in sharpening double bladed chains wherein accurate alignment of the blade with an ordinary machine bench grinder wheel must be kept during sharpening and where the attachment must be easily disengageable from the grinder housing. However, it should be realized that the present invention could be applied to, for example, any application where it is desired to sharpen mechanisms on a continuous chain with an ordinary bench machine grinder.

In the preferred embodiment of the present invention, the attachment of the accessory is accomplished through the use of a bracket, which is a part of the accessory, mounted on the housing of the grinder in a hole normally provided on the grinder. The proper alignment of the accessory with the grinder is then accomplished by firmly securing a bushing to the mounting bracket at an appropriate location to generally position a chain holding tool and then inserting mounting arms connected to the chain holding tool telescopically into the bushing. Latching dogs are used to prevent the withdrawal of the tool inadvertently during sharpening. Mounting arms are provided for both sides of the tool, including latching dogs, to permit reversal of the tool to sharpen both sets of cutting edges of the chain saw blade.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 3 is a top elevated view of the chain positioning and holding tool of the preferred embodiment of the apparatus of the present invention; while FIG. 4 is a bottom elevated view of the positioning and holding tool of the preferred embodiment of the apparatus of the present invention; while FIG. 5 is a side elevated view of the positioning and holding tool of the preferred embodiment of the apparatus of the present invention; while

STRUCTURE AND ITS METHOD OF USE

Figure 7:
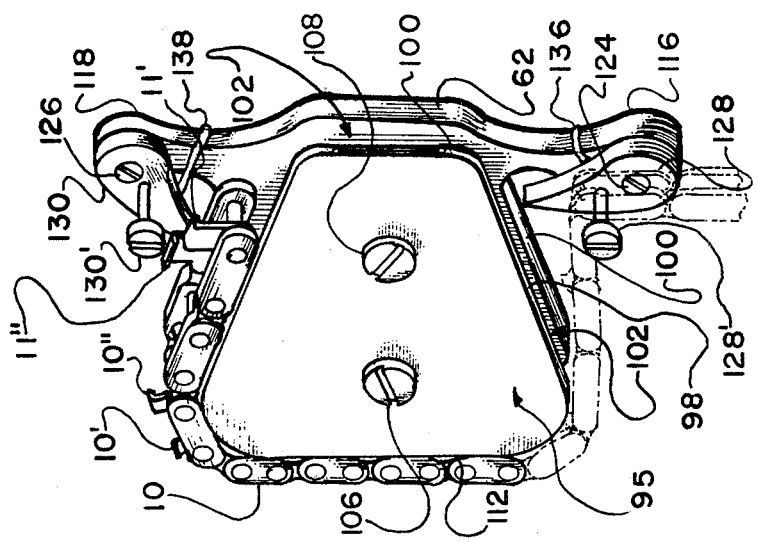
FIG. 7 is a close-up view of the main body of the positioning and holding tool, showing the general structure of the chain saw and the locking and holding engagement of the tool with it.

Referring to FIG. 7, a typical standard cutting chain 10, with alternate side teeth 10', 10" for a cutting saw is generally illustrated. As is known, the standard cutting chain 10 for a chain saw usually comprises a shank or main body portion having a sprocket or tooth portion on the inner or nonworking edge of the chain 10. The rider portion or depth gauge is on the outer portion of the chain 10 as is the working portion of the teeth 10',10", which preferably are formed with an extra or double thickness of metal. The forward face, cutting edge 11', 11" of the working portion of the teeth are curved and beveled and form a partial hook formation which terminates forwardly and inwardly in a cutting, chisel-edge toe or tip. The top line of the working portion slopes slightly downwardly and rearwardly. As usual, the teeth 10', 10" are connected by pairs of links to adjacent members or teeth in the chain 10. If a chain 10 is not positioned in proper alignment with the grinding wheel 115, it would be possible to cut away the toe of the chain 10 entirely and to undercut the edge below the tip excessively which would result in an extended tip or hook causing the teeth 10', 10" to grab too much and which would also have more tendency to break off. Furthermore, the cutting away of more of the groove between a tooth rider and a cutting edge would weaken the shank portion. This accurate and proper positioning of the chain 10, when it is presented to the grinder wheel 115 for sharpening of the teeth 10', 10", is most important and such is achieved by the simple straight forward apparatus of the present invention.

Figure 1:
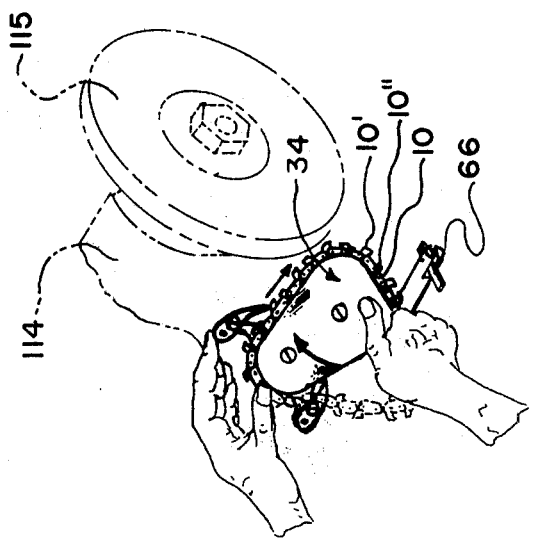
FIGS. 1 and 2 are side perspective views of the preferred embodiment of the system of the present invention in use to sharpen a chain saw blade, FIG. 1 being from the left side with the system being used to sharpen one side of the chain saw blades, and FIG. 2 being from the right side with the chain positioning and holding tool being flipped to sharpen the other side of the chain saw blades.
Figure 6:
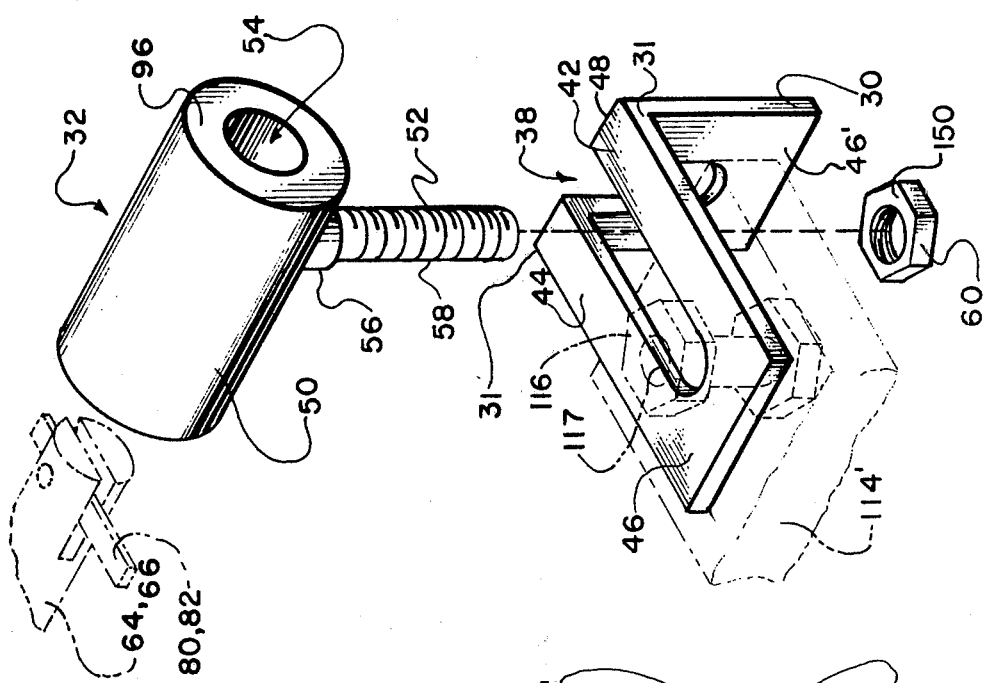
FIG. 6 is a side, exploded, isometric view of the bushing attachment system of the preferred embodiment of the apparatus of the present invention with some of the related structures in phantom line.

Referring to the figures generally, the three basic components of the preferred embodiment of the apparatus of the present invention are shown as bracket 30, bushing 32, and chain holding tool 34. Bracket 30 is adapted to connect directly to the standard bolt 116 in the grinder body 114' as best shown in FIGS. 1 and 6. Bushing 32 is adapted to engage and firmly mount on sides 42, 44 of slot 38 of bracket 30 at any desired position. The chain holding tool 34 has alternate mounting arms 64, 66 to pivotally and telescopically engage bushing 32 and be loosely latched thereto by dogs 80, 82 respectively. In this manner, as will be explained more fully below, chain 10 may be mounted on the chain holding tool 34 and be accurately positioned with regard to grinder wheel 115 of grinder 114.

Figure 8:
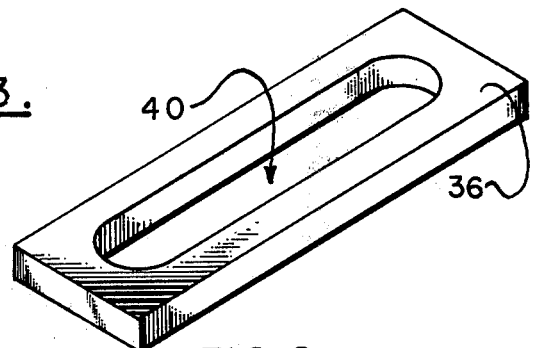
FIG. 8 is a isometric view of an alternate embodiment of the supporting bracket, the alternate embodiment being straight rather than L-shaped and which allows the bushing to be positioned further away from the grinder machine.

Referring particularly to FIG. 6, there is shown right angle bracket 30 which is rectangular in shape bent at 31 having top 46 and front 46'. An alternate bracket 36 which is a straight, rectangular shaped bracket is shown in FIG. 8. Either bracket 30 or 36 is formed of, for example, a single piece of stamped metal having a length such as, for example, 5 inches wherein bracket 30 is formed by bending a straight bracket such as, for example, bracket 36 at 31 to for front 34. Slots 38, 40 of brackets 30, 36, respectively, are formed in the center of the bracket by side pieces 42 and 44, back end 46 and front end 48. Slots 38, 40 may have for example, a width of five-sixteenths of an inch between sides 42 and 44 and a length of for example, 4¼ inches between back 46 and front 48. The width between sides 42 and 44 must be sufficient to permit bolt 117 to be inserted at back 46 into a hole (not shown) in the grinder 114' and permit it to be secured with nut 116.

Referring particularly to FIG. 6, there is shown bushing 32 comprising upper piece 50 and lower piece 52. Upper piece 50 is cylindrical in shape having bore 54 therethrough and collar 56 thereunder. Lower piece 52 is threaded having threads 58 of such a pitch as to mate with collar 56 and of such a width to fit within the slot 38 formed between sides 42 and 44 of brackets 30, 36. Upper member 50 may be formed from any material, such as, for example, aluminum or steel with a length of, for example, 1¾ inches. Lower member 52 may also be made of any material, such as, for example, aluminum or steel with a length of, for example, 1¼ inch and must be sufficient in length to permit insertion within slot 38 and secured by the portion of lower member 52 below slot 38 holding nut 60 against sides 42, 44. Nut 60 may be of any suitable size, such as, for example, five-sixteenths of an inches. The bushing 32' is mounted so that the bore 54 extends parallel to the axis of rotation of the grinder wheel 115.

Figure 2:
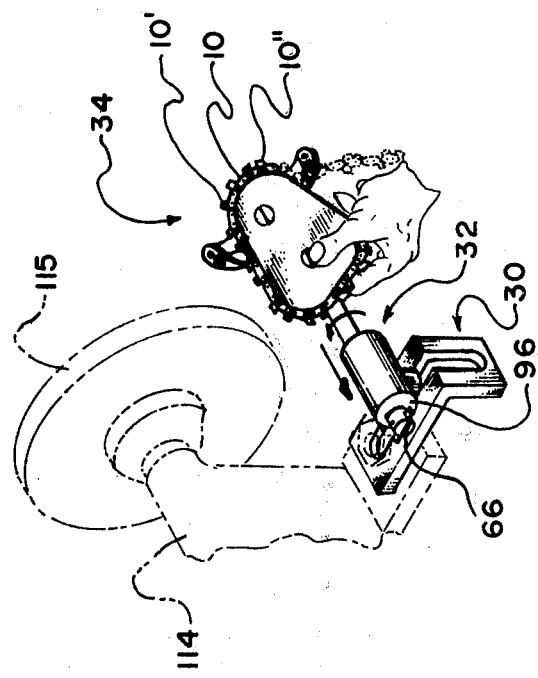
Figure 3:
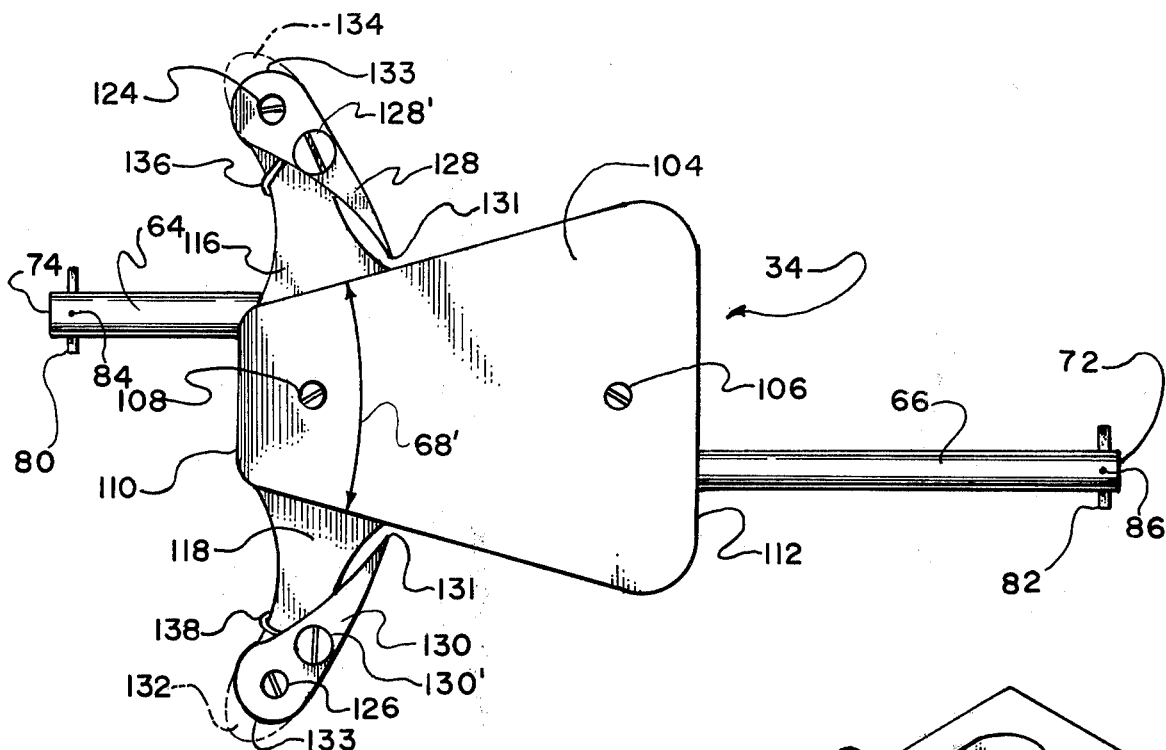
Figure 4:
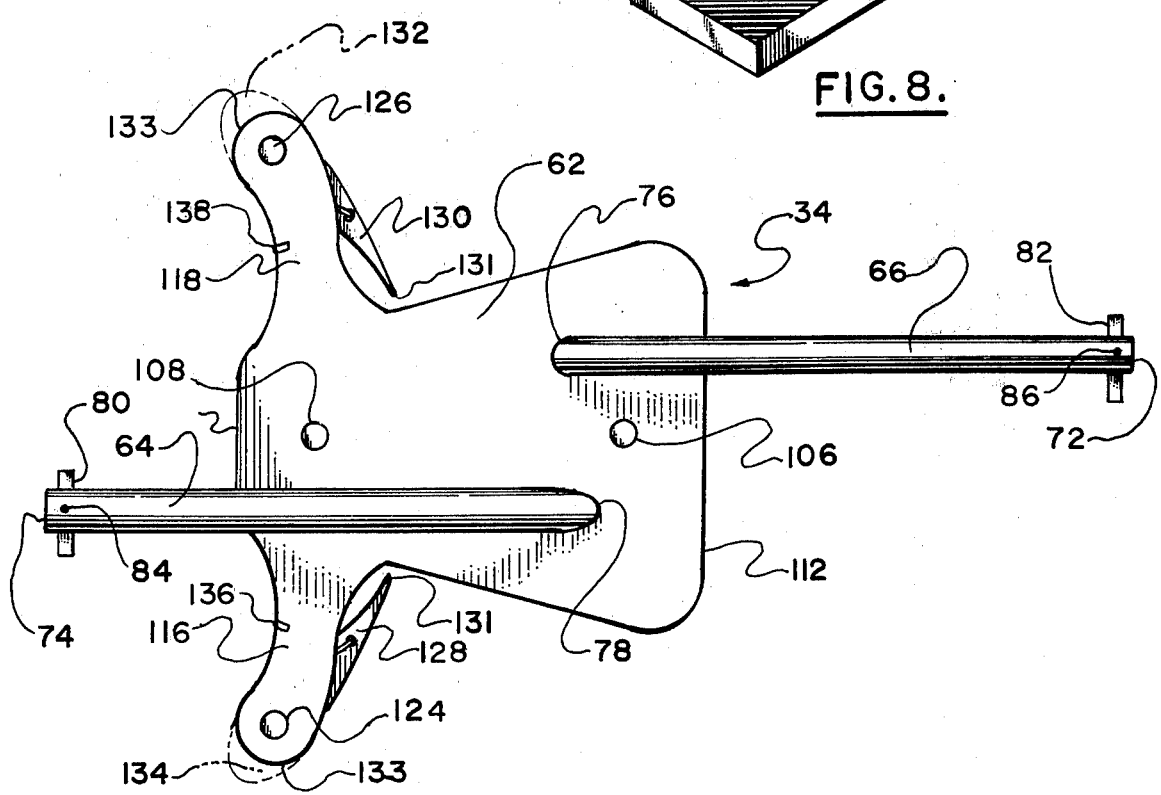
Figure 5:
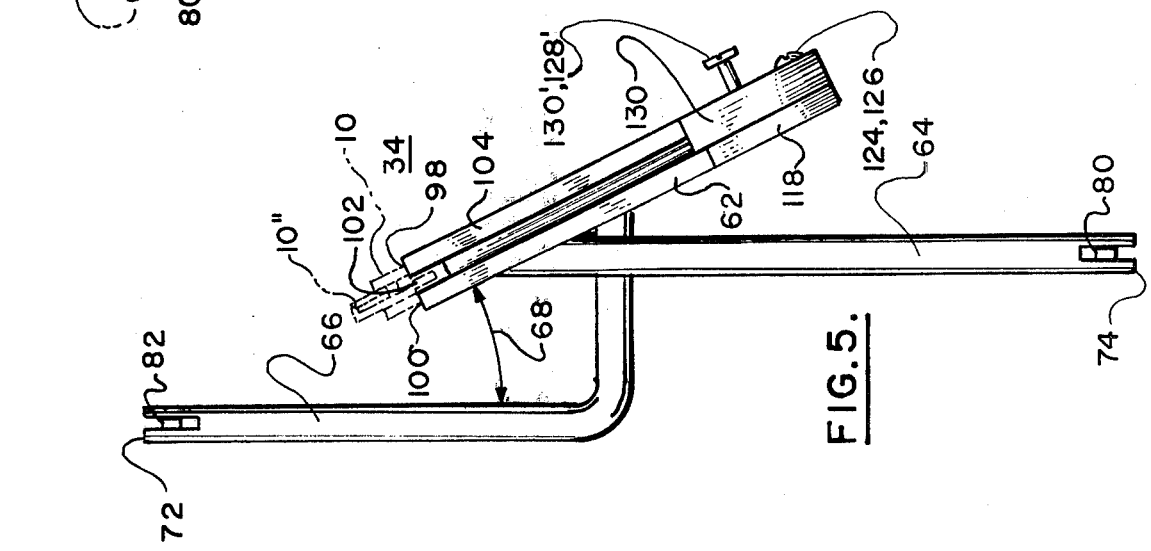

Referring to FIGS. 3, 4, and 5, there is shown tool 34 made of any material sufficient to withstand mechanical pressures for holding chain 10. Referring particularly to FIG. 4, the lower portion 62 of tool 34 has formed thereon mounting arms 64, 66 of any suitable diameter such as, for example, one-half inch. These arms are formed by welding or other suitable process at an angle (shown by angle line 68 in FIG. 5) of, for example, 27°. The over all length of arms 64, 66 from end 72 of arm 66 to end 74 of arm 64 may be of any suitable length, such as, for example, 7 inches with the arm lengths from end 72 to 76 for arm 66 and end 74 to end 78 of an equally appropriate dimensions, such as, for example, 4 inches. The arm lengths should be such as to permit insertion and locking by dogs 80, 82 within channel 54 and extension of tool 34 to the sharpening position with respect to the grinding wheel 115 (note FIGS. 1 and 2).

Dogs 80, 82 of tool 34 are rotatably mounted by mountings 84, 86 of arms 66, 64, respectively, to permit an axial position with arms 66, 64, respectively, (FIG. 5) during insertion of either arms 66, 64 within bore 54 of bushing 32; and a perpendicular position with respect to arms 66, 64 (FIG. 4) during grinding operations. Dogs 80, 82 should have sufficient side extensions to permit them to contact surface 96 of bushing 32 as the operator draws the tool 34 against the bushing 32 to form a firm lock.

Referring to FIGS. 4 and 5, the body 96 of tool 34 is generally trapezoidal in shape, the sides thereof making an angle of, for example, 30° (note angle line 68' in FIG. 3), the sides hence being substantially non-parellel.

Side surfaces 98, 100 extend inwardly from the outer peripheries of top 104 and bottom 62 of body 96 to the interior of the body 96, thereby forming a channel 102 of sufficient depth to receive the clutch link of the chain 10. The portions of body 96 having top 104 and bottom 62, respectively, are held together by screws 106, 108 and sandwiched together if desired with either an inner plate or offset collars. The length of body 96 may be of any suitable length, such as, for example, three inches from end 110 to end 112 to permit alignment of grinder wheel 115 and chain 10, with the narrow width at end 110 of any suitable dimensions such as, for example, 1⅛ inches, and with the wide width at end 112 of any suitable dimension such as, for example, 2½ inches. Body 95 may be placed with respect to arms 64, 66 in any suitable manner such as, for example, the length between end 74 and end 110 being one and one quarter inches and the distance between end 112 and end 72 being 2¾ inches.

Arm extensions 116, 118 extend from the sides of bottomplate 62. Pivotably mounted on arms 116, 118 by pivots 124, 126, respectively, are holder pins 128, 130 respectively. Holder pin 128, 130 may be of any suitable length to reach chain 10 and hold it from movement during the sharpening of teeth 10', 10" such as, for example, 1¾ inches between ends 131 and 133 respectively. Extensions 132, 134 shown in phantom line in FIG. 3 may optionally be employed where hoods (not shown) on grinder 114 permit. Pivots 126, 124 are springloaded by springs 136, 138, respectively, to urge holders 130, 128, respectively, against chain 10.

When the chain for the saw is to be sharpened, bracket 30 or 36 is attached to the base 114' of grinder 114 by bolt 117 and nut 116. After securing bracket 30 or 36, lower end 52 of bushing 32 is inserted within slot at the appropriate position to gain alignment of tool 34 with grinder wheel 115 and secured in position by nut 60 acting on threads 58 to engage the bracket sides 42, 44 between collar 56 and top surface 150 of nut 60. Either arm 64 or 66 with dog 82, 80, respectively, in the extended position (FIG. 5) then is inserted into bore 54 of upper piece 50 of bushing 32. Either dog 82, 80 is then moved to the locked position and tool 34 moved away from bushing 32 to secure ends of the dog against surface 96. Bore 54 is of suitable diameter to permit legs 64, 66 to rotate within bore 54 about the axis of bore 54 to present the chain 10 on the tool 64 to grinding wheel 115.

Tool 34 is then rotated about the axis of bore 54 toward grinder wheel 115 bringing teeth edge 11', 11" (as appropriate) into contact with grinder wheel 115 for sharpening. After a blade has been sharpened, the operator, by manipulating extensions 132, 134 for grinders permitting the use of tools with extensions or by manipulating the portion 131, 129 of holder 128, 130 at pivot 124, 126 respectively for the release to index chain 10 to the next edge.

After all blades on one side of the chain 10 have been sharpened, pressure is relased against dog 82 and 80 and the dog is moved to the open position. Tool 34 may then be removed from bore 54. Tool 34 is then reversed with the other of holders 128, 130 used to secure chain 10 in the proper index to tool 34 and the opposite dog is inserted into bore 54. Thereafter, the process of locking the dog and sharpening the chain 10 is repeated as just described.

The two positions of the chain holding tool 34 for sharpening each side of the chain 10 are shown in FIGS. 1 and 2. The proper angular positioning of the teeth tips or edges 11', 11" of the teeth 10', 10" is achieved by the proper selection of angle 68 and 68', in the exemplary case being 27° and 30°, respectively. It should be appreciated that a certain amount of axial play of the mounting arms 64, 66 in bushing 32 is present allowing the tool to be moved sideways toward the grinder wheel 115 at the same time as the tool 34 is pivotally moved upward toward the grinder wheel 115 (note directional arrows in FIGS. 1 and 2), while the holder pins 128, 130 (as appropriate) bearing against the back side of the tooth being sharpened prevents the tooth from moving away from the wheel 115.

After the chain has been sharpened, the apparatus may be removed to permit use of the grinder for other purposes by releasing pressure against face 96, placing dog 80 or dog 82 (as appropriate) into the open position and removing tool 34 from bushing 32. Bushing 32 may then be released from bracket 30 or 36 by releasing nut 60 from lower end 52. Bushing 32 may then be removed from slot 38. Depending on the use of grinder wheel 115, brackets 30 or 36 may be left attached to grinder 114 or removed by loosening the nut 116.

During sharpening, the chain 10 is looped over the manipulating handles 128' or 130' (as appropriate) which is not used to fixedly hold the chain per se but rather support the weight of the chain and permit the operator greater freedom for manipulating the chain.

Although the system described in detail supra has been found to be most satisfactory and preferred, many variations in structure and method are possible. For example, any suitable dimensions for the various elements of the tool may be used depending upon the specifics of the grinder and the design of the tooth structure to be sharpened. Moreover, any suitable material of construction may be used. Additionally, any type of locking mechanism to hold the arms and the bushing may be used.

Additionally, although mounting and designing and bushing 32 so that the pivot direction is about axis parallel to the axis of rotation of the grinder wheel 115 is most preferred, the angles 68, 68' could be varied by varying such pivoting axis in the vertical and/or horizontal planes, which approach is considered to be the equivalent of that illustrated as preferred. Also to achieve continuous exact angular positioning of the tooth edge to the grinder wheel as the diameter of the latter changes due to use or by using different wheels, a vertical adjustment of the bushing support 52 could be provided so that the chain always contacts the wheel at its horizontal line or outer tangential point.

The above are merely exemplary of the possible changes or variations.

Because many varying and different embodiments may be made within the scope of the inventive concept herein taught and because many modifications may be made in the embodiment herein detailed in accordance with the descriptive requirements of the law, it should be understood that the details herein are to be interpreted as illustrative and not in a limiting sense.

What is claimed as invention is:

1. A grinder accessory for a bench grinder to adapt the bench grinder to sharpen blades attached to a chain comprising:
   securement means for orienting, moving, and holding said chain in a semi-fixed relation to said grinder, and;
   holding means for removably relocating said securement means to said grinder, said securement means includes a first shaft means including a first shaft for angularly and longitudinally orienting such blades to said grinder, said holding means includes rotation means for holding said first shaft means and permitting said first shaft to rotate about the axis of said first shaft and setting the longitudinal orientation of such blades, said longitudinal orientation providing the spacing between said rotation means and said wheel to place said blades opposite said grinder, and wherein said first shaft includes a locking dog pivotably mounted on said first shaft having a locked and unlocked position, and said rotation means includes a bushing, said bushing having means including an end surface of said bushing for holding said locking dog in said locked position of said locking dog.

2. The grinder accessory of claim 1 wherein said holding means includes alignment means for positioning said first shaft a determinable distance from such grinder wheel.

3. The grinder accessory of claim 1 wherein said holding means is removably attached to such grinder.

4. The grinder accessory of claim 1 wherein such blades have a sprocket and said securement means includes a slot for receiving such sprocket.

5. A grinder accessory for attachement to a bench grinder to sharpen blades attached to a chain by the bench grinder wheel, comprising:
   securement means for holding such chain in fixed relation to such grinder wheel;
   holding means for removably attaching said securement means to such grinder;
   said securement means inculding a first shaft means including a first shaft for orienting such blades to such grinder wheel and said holding means includes rotation means for holding said first shaft means and permitting said first shaft to rotate about the axis of said first shaft; and
   wherein said blades are mounted on two sides of such chain and said first shaft means orients such blades of such one side of such chain; and said securement means includes second shaft means including a second shaft mounted oppositely said first shaft for orienting such blades of such other side of such chain.

6. The grinder accessory of claim 5 wherein said securement means further includes first indexing means and second indexing means for holding such blades to accurately position a single blade in fixed relation to such grinder wheel.

7. The grinder accessory of claim 6 wherein said first and said second indexing means include support means for supporting such chain.

8. The grinder accessory of claim 6 wherein said first and said second indexing means include spring mount means for urging said indexing means to hold such blades and tap means for permitting release of such blades by indexing means.

9. The grinder accessory of claim 5 wherein said first shaft includes means for engaging said holding means upon force applied to said second shaft drawing said second shaft away from said holding means.

10. The method of using a bench grinder including a grinder wheel having a generally fixed position to sharpen blades mounted on a chain, comprising the steps of:

A. attaching an accessory to the grinder to orient and hold the blades in contact with said grinder;
   B. attaching the chain to the accessory to present the blades to said grinder;
   C. moving the chain on the accessory toward the fixed grinder wheel and positioning a portion of the accessory to orient and hold the blades in contact with said grinder;
   D. sharpening the blades individually with the fixed grinder wheel;
   E. detaching the accessory from the grinder;
   wherein the blades are located on both sides of the chain and the accessory includes a holding tool for the chain; step B includes the step of attaching the chain to the holding tool to present one set of blades to the grinder wheel; step D includes the steps of sharpening one set of blades, turning the holding tool over, and reattaching the chain to the holding tool to present the other set of blades to the grinder wheel, and sharpening the other set of blades.

11. The method of claim 10 wherein step D includes the step of rotating the accessory tool toward the grinder wheel.

12. An accessory for a grinder machine for sharpening the saw teeth on a chain for a chain saw comprising:
   a chain positioning and holding tool having opposed but substantially non-parallel sides having means for holding the chain on said sides; and
   an easily attachable and detachable tool mounting means including a bushing for mounting said chain positioning and holding tool to said grinder, said mounting means including attachment means for attaching said bushing to the grinding machine at a disposition parallel to the axis of rotation of the grinder wheel of the grinder machine, said chain holding and positioning tool being pivotally connectable to said bushing about an axis at least generally parallel to the axis of rotation of the grinder wheel of the grinder machine.

13. An accessory for a grinder machine for sharpening the saw teeth on a chain for a chain saw, comprising:
   a chain positioning and holding tool having opposed but substantially non-parallel sides having means for holding the chain on said sides;
   an easily attachable and detachable tool mounting means including a bushing for mounting said chain position and holding tool to said grinder, said mounting means including attachment means for attaching said bushing to the grinding machine at a disposition parallel to the axis of rotation of the grinder wheel of the grinder machine, said chain holding and positioning tool being pivotally connectable to said bushing about an axis at least generally parallel to the axis of rotation of the grinder wheel of the grinder machine; and
   wherein said tool includes an at least generally flat trapezoidally shaped main body having two opposed parallel arms extending away from said main body in opposite directions at a substantially non-perpendicular angle from the main surface of said main body but perpendicular to the parallel sides of said main body.

* * * * *